United States Patent
Sun

(10) Patent No.: US 11,519,206 B2
(45) Date of Patent: Dec. 6, 2022

(54) LOCK DEVICE FOR GRAPHITE FURNACE

(71) Applicant: Shimadzu Corporation, Kyoto (JP)

(72) Inventor: Shengsheng Sun, Shanghai (CN)

(73) Assignee: Shimadzu Corporation, Kyoto (JP)

( * ) Notice: Subject to any disclaimer, the term of this patent is extended or adjusted under 35 U.S.C. 154(b) by 104 days.

(21) Appl. No.: 17/043,467

(22) PCT Filed: Mar. 8, 2019

(86) PCT No.: PCT/JP2019/009516
§ 371 (c)(1),
(2) Date: Sep. 29, 2020

(87) PCT Pub. No.: WO2019/188150
PCT Pub. Date: Oct. 3, 2019

(65) Prior Publication Data
US 2021/0115710 A1 Apr. 22, 2021

(30) Foreign Application Priority Data
Mar. 30, 2018 (CN) .......................... 201820446013.5

(51) Int. Cl.
*E05C 3/30* (2006.01)
*E05C 3/40* (2006.01)
(Continued)

(52) U.S. Cl.
CPC .................. *E05C 3/30* (2013.01); *E05C 3/40* (2013.01); *F27B 17/02* (2013.01);
(Continued)

(58) Field of Classification Search
CPC ...... E05B 2015/0448; E05C 3/30; E05C 3/40; E05C 3/00; E05C 3/004; E05C 3/12;
(Continued)

(56) References Cited

U.S. PATENT DOCUMENTS 4,432,643 A 2/1984 Koizumi et al.
4,603,239 A * 7/1986 Ishii .................... E05B 47/0607
235/22

(Continued)

FOREIGN PATENT DOCUMENTS

BR 202014026811 * 7/2016
CN 103181034 A 6/2013
(Continued)

OTHER PUBLICATIONS

Written Opinion of the International Searching Authority (ISA237) for PCT application No. PCT/JP2019/009516, dated Apr. 9, 2019, submitted with a machine translation.

*Primary Examiner* — Christine M Mills
*Assistant Examiner* — Yahya Sidky
(74) *Attorney, Agent, or Firm* — Muir Patent Law, PLLC

(57) ABSTRACT

The present utility model relates to a graphite furnace locking device, comprising: a stationary part which is provided with a locking unit, a movable part which is arranged along a first direction facing the stationary part, the movable part being provided with a latch bolt unit; wherein, the movable part may move towards the stationary part along the first direction until the latch bolt unit and the locking unit are connected and then the locking device is in a locked state; the latch bolt unit provides a first elastic force for the movable part towards the direction of the stationary part; the locking unit is used to disconnect from the latch bolt unit, and then the locking device is in an unlocked state; the latch bolt unit provides a second elastic force for the movable part in a direction away from the stationary part, and the movable part can move away from the stationary part in the first direction under the action of the second elastic force to its initial position. For the locking device of the present utility model, when it is under an unlocked state, the movable part (Continued)

is automatically sprung away to prevent the operator from being injured by scalding.

7 Claims, 2 Drawing Sheets

(51) Int. Cl.
*F27B 17/02* (2006.01)
*G01N 21/74* (2006.01)

(52) U.S. Cl.
CPC ..... *E05Y 2201/474* (2013.01); *E05Y 2900/60* (2013.01); *G01N 21/74* (2013.01)

(58) Field of Classification Search
CPC . E05C 3/124; E05C 3/14; E05C 3/145; E05C 3/16; E05C 3/162; E05C 3/167; E05C 3/22; E05C 3/24; E05C 3/26; F27B 17/02; E05Y 2201/474; E05Y 2900/60; G01N 21/74; Y10T 292/0911; Y10T 292/0926; Y10T 292/0928; Y10T 292/0933; Y10T 292/0934; Y10T 292/0945; Y10T 292/0948; Y10T 292/0951; Y10T 292/0952; Y10T 292/0953; Y10T 292/0959; Y10T 292/1043; Y10T 292/1051; Y10T 292/1052; Y10T 292/106; Y10T 292/1061; Y10T 292/1075; Y10T 292/1078; Y10T 292/1083; Y10T 292/1084; Y10T 292/1085; Y10T 292/1092; Y10S 292/37
See application file for complete search history.

(56) References Cited

U.S. PATENT DOCUMENTS

| | | | | |
|---|---|---|---|---|
| 5,723,850 | A | * | 3/1998 | Lambert .............. G07G 1/0027 235/22 |
| 2006/0022031 | A1 | * | 2/2006 | Chien .................. G07G 1/0027 235/22 |
| 2013/0193923 | A1 | | 8/2013 | Kimura et al. |
| 2016/0153213 | A1 | * | 6/2016 | Huang .................... E05B 63/08 292/144 |

FOREIGN PATENT DOCUMENTS

| | | |
|---|---|---|
| DE | 3110783 A1 | 2/1982 |
| EP | 2631995 A1 | 8/2013 |
| JP | 56-132547 A | 10/1981 |
| JP | 197051/1987 U | 12/1987 |
| JP | 2002-324624 A | 11/2002 |
| WO | 2012/053221 A1 | 4/2012 |

* cited by examiner

LOCK DEVICE FOR GRAPHITE FURNACE

TECHNICAL FIELD

The present utility model relates to the technical field of analysis and measurement in the instrument and meter industry and specifically relates to a graphite furnace locking device.

BACKGROUND ART

Atomic absorption spectrophotometer works by employing a graphite furnace head; when the graphite furnace head is electrically heated in the graphite furnace, the graphite furnace head is tightly clamped by graphite furnace locking device 2, and thus there is a constant presence of elastic force compressing inwardly, so as to ensure the graphite heating element in the central area has good conductivity with the electrode. With reference to FIG. 1, the graphite furnace locking device 2 comprises: stationary part 21 and movable part 22, stationary part 21 being arranged face to face with movable part 22 along a first direction (as shown by the direction of X in FIG. 1). Lock shaft 23 is provided on movable part 22, and lock shaft 23 penetrates through movable part 22 along the first direction; pre-tightening spring 24 is sleeved on lock shaft 23. The portion of movable part 22 facing stationary part 21 is provided with guide rod 25, and stationary part 21 is provided with a through-hole to accommodate guide rod 25.

Lock pin 26 is provided on stationary part 21, and lock pin 26 extends along the first direction. Unlock button 28 and lock pin spring 27 are also provided on stationary part 21, and lock pin 26 is located between unlock button 28 and lock pin spring 27. Unlock button 28 is inserted into stationary part 21 along a direction perpendicular to the first direction, and one end is located outside of stationary part 21, and the other end is connected with lock pin 26. One end of lock pin spring 27 is connected with lock pin 26, and the other end is connected with stationary part 21.

When the graphite furnace head is electrically heated, with reference to FIG. 3, lock shaft 23 is pressed along the direction facing the stationary part 21 (as shown in the direction of 8 in FIG. 2), so that movable part 22 moves towards stationary part 21 to reach lock shaft 23 in order to connect with lock pin 26; at this point, graphite furnace locking device 2 is in a locked state; pre-tightening spring 24 on movable part 22 provides an elastic force compressing towards the direction of stationary part 21, so as to ensure the graphite heating element in the central area has good conductivity with the electrode.

When heating of the graphite furnace head is completed, unlock button 28 is pressed down, and unlock button 28 presses lock pin 26, then lock pin spring 27 is compressed; lock pin 26 performs a lever motion and the end of lock pin 26 connected with lock shaft 23 disconnects from lock shaft 23, then lock shaft 23 moves along the direction away from stationary part 21 under the action of pre-tightening spring 24 and, at this point, graphite furnace locking device 2 is in an unlocked state. However, after lock shaft 23 disconnects from lock pin 26, movable part 22 does not move along with it to move away from stationary part 21, and movable part 22 needs to be moved away manually. As the graphite furnace head is heated, the core temperature could reach thousands of degrees, and a high-power supply is also connected (the transient current could reach 100 amp.) right after heating or when electricity is powered on without heating; thus, it is not suitable to be moved manually as there is a certain degree of safety risk.

SUMMARY OF THE INVENTION

Problems to be Solved by the Invention

The problem to be solved by the present utility model is that, for the graphite furnace locking device in the prior art, when it is under an unlocked state, the movable part needs to be moved away manually, which poses certain risks.

Means for Solving the Problem

To solve the above problem, the objective of the present utility model is to provide a graphite furnace locking device, comprising: a stationary part which is provided with a locking unit;

a movable part which is arranged along a first direction facing the stationary part, the movable part being provided with a latch bolt unit;

wherein, the movable part may move towards the stationary part along the first direction until the latch bolt unit connects to the locking unit and then the locking device is in a locked state;

the latch bolt unit provides a first elastic force for the movable part towards the direction of the stationary part;

the locking unit is used to disconnect from the latch bolt unit, and then the locking device is in an unlocked state;

the latch bolt unit provides a second elastic force for the movable part in a direction away from the stationary part, and the movable part can move away from the stationary part in the first direction under the action of the second elastic force to its initial position.

Optionally, the latch bolt unit comprises: a lock shaft which penetrates through the movable part along the first direction to be inserted in the stationary part, the lock shaft being able to move in the first direction relative to the stationary part and the movable part respectively;

a first protrusion portion, provided on the lock shaft, used to connect with the locking unit;

a first elastic element, with one end connected with one end of the lock shaft that goes away and extends out from the stationary part, and the other end connected with the movable part;

a second elastic element, a first protrusion portion being located between the first elastic element and the second elastic element, one end of the second elastic element being connected with the lock shaft, and the other end being connected with the stationary part.

Optionally, the first elastic element is sleeved on the lock shaft.

Optionally, the movable part has a first through-hole to be penetrated through by the lock shaft, the first elastic element being at least partially located in the first through-hole, the other end of the first elastic element being connected with the wall of the first through-hole.

Optionally, the end of the stationary part where the lock shaft extends out from is provided with a second protrusion part, the one end of the first elastic element being connected with the second protrusion portion.

Optionally, the second elastic element is sleeved on the lock shaft.

Optionally, the stationary part has a second through-hole to be inserted by the lock shaft, the second elastic element being at least partially located in the second through-hole, the other end of the second elastic element being connected with the wall of the second through-hole.

Optionally, the portion of the movable part facing the stationary part is further provided with a guide rod extending along the first direction, the stationary part is provided with a third through-hole to accommodate the guide rod.

Optionally, the locking unit comprises: a lock pin which is arranged in parallel with the lock shaft, having a first end and second end along the first direction, the first end being closer to the movable part compared with the second end, a rotation shaft being provided between the first end and the second end, the lock pin being in rotational connection with the stationary part through the rotation shaft, the portion of the first end facing the lock shaft having a recess portion to accommodate the first protrusion portion;

a third elastic element, one end being connected with the stationary part, the other end being connected with the portion of the first end back facing the lock shaft, or, the other end being connected with the portion of the second end facing the lock shaft;

an unlock button, operably inserted in the stationary part along the direction perpendicular to the first direction, and one end being located outside of the stationary part, the other end being connected with the portion of the second end back facing the lock shaft, the unlock button being used for pressing the lock pin to separate the first protrusion portion from the recess portion.

Optionally, the portion of the first end facing the lock shaft is provided with a slope which is used to guide the first protrusion portion to be accommodated in the recess portion when the first protrusion portion moves to contact the lock pin.

Effects of the Invention

As above, the graphite furnace locking device provided by the present utility model comprises a stationary part and a movable part arranged face to face along the first direction. A locking unit is provided on the stationary part, and a latch bolt unit is provided on the movable part. When the graphite furnace head is electrically heated, the movable part may move towards the stationary part in the first direction to the latch bolt unit so as to connect with the locking unit; when the graphite furnace locking device is in a locked state, the latch bolt unit provides a first elastic force for the movable part towards the direction of the stationary part; the graphite furnace locking device tightly clamps the graphite furnace head under the action of the first elastic force to ensure the graphite heating element in the central area has good conductivity with the electrode.

When heating of the graphite furnace head is completed, the locking unit is pressed down, and the locking unit disconnects from the latch bolt unit, then the locking device is in an unlocked state; the latch bolt unit provides a second elastic force for the movable part in a direction away from the stationary part, and the movable part moves in the first direction and away from the stationary part under the action of the second elastic force to the initial position. It is equivalent to that, when the graphite furnace locking device is in an unlocked state, the movable part is automatically sprung away to prevent the operator from being injured by scalding to ensure the safety and convenience in operation.

To make the above disclosure of the present utility model easier to understand, some preferred examples are listed below in combination with the appended figures for detailed explanation.

EMBODIMENTS FOR CARRYING OUT THE INVENTION

The embodiment of the present utility model will be illustrated below with specific examples. A person skilled in the art may easily understand the other advantages and effects of the present utility model through the disclosure of the Description. Although the description of the present utility model will incorporate some preferred examples to facilitate the illustration, it does not mean the features of the present utility model are limited to such embodiment. On the contrary, the objective of incorporating the embodiment for the introduction of the utility model is to encompass the other selections or modifications possibly derived from the claims of the present utility model. To facilitate an in-depth understanding of the present utility model, many specific details will be included in the description below. The present utility model may also be implemented without employing these details. In addition, in order to avoid confusion or distorting the key points of the present utility model, certain specific details will be omitted in the description.

For the graphite furnace locking device in the prior art, when it is in an unlocked state, the movable part needs to be moved away manually, which poses certain risks. For the graphite furnace locking device provided by the present utility model, when it is in an unlocked state, the movable part is automatically sprung away to ensure the safety and convenience in operation.

Figure 1:
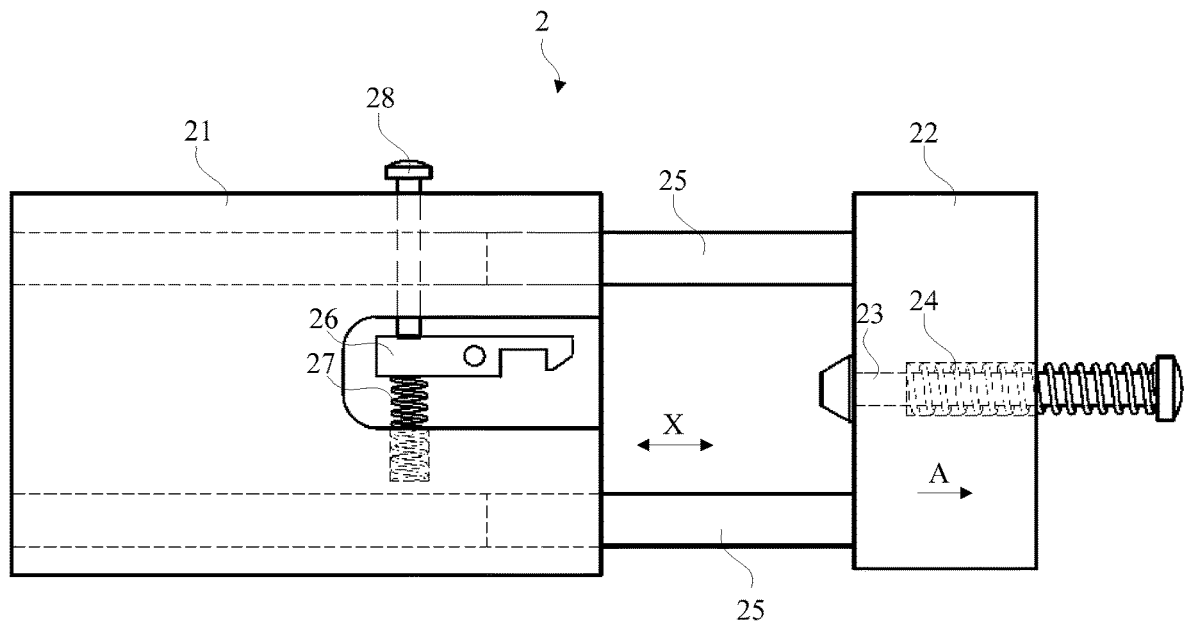
FIG. 1 is Top View I of a graphite furnace locking device in the prior art, wherein the graphite furnace locking device is in an unlocked state.
Figure 2:
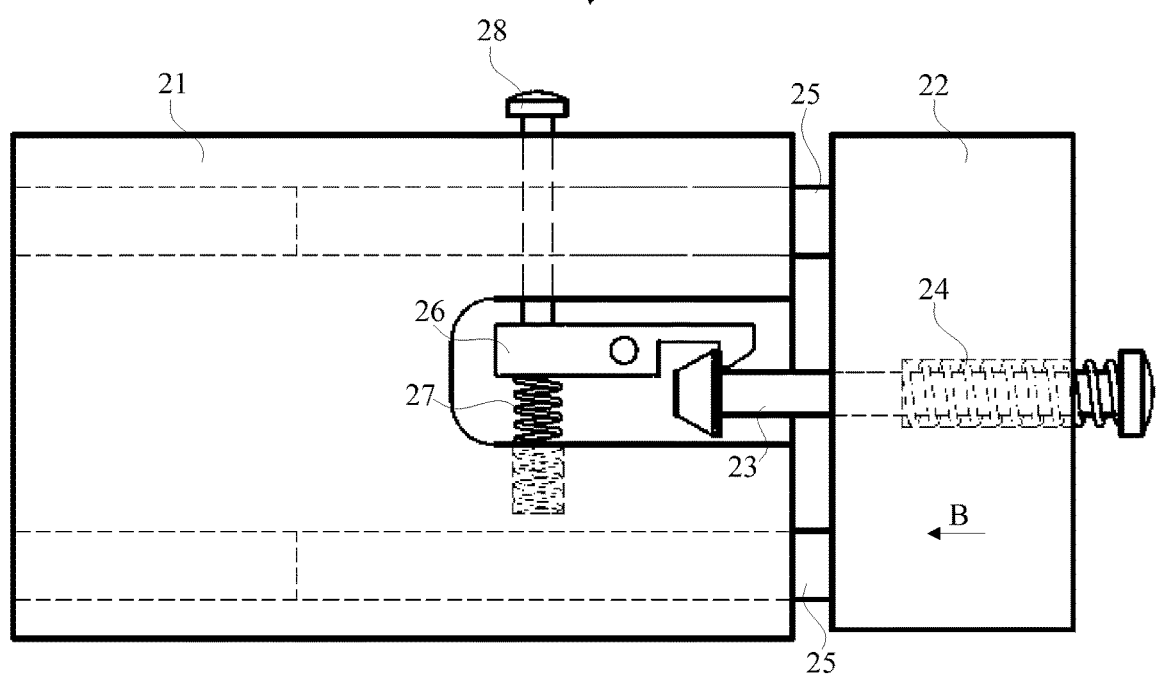
FIG. 2 is Top View II of a graphite furnace locking device in the prior art, wherein the graphite furnace locking device is in a locked state.
Figure 3:
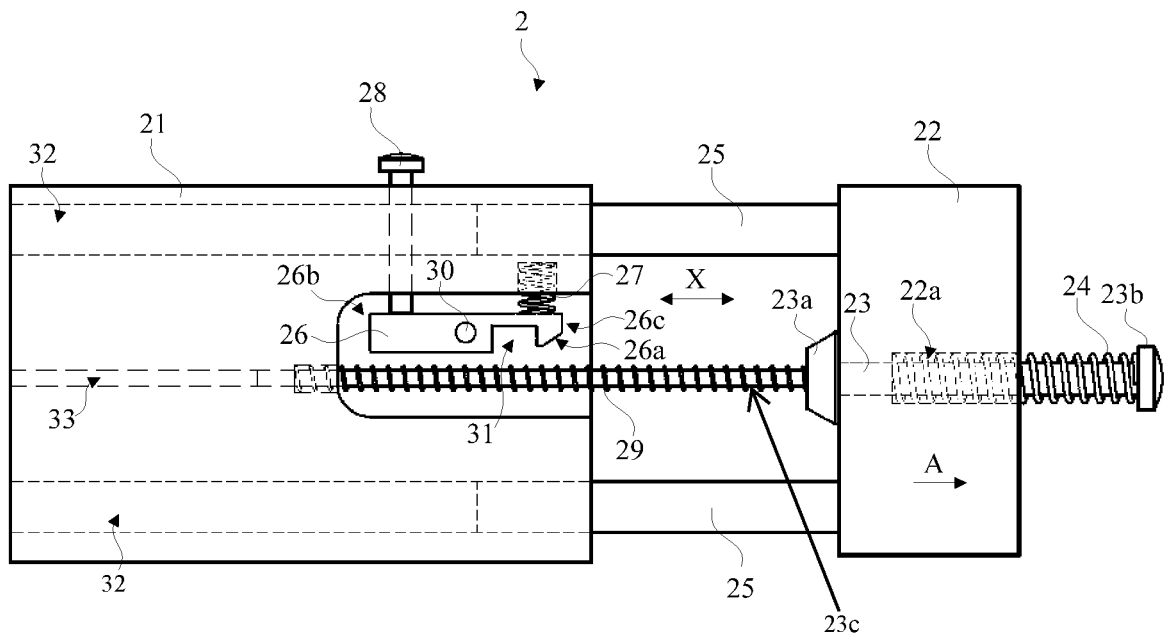
FIG. 3 is Top View I of a graphite furnace locking device in the example of the present utility model, wherein the graphite furnace locking device is in an unlocked state.
Figure 4:
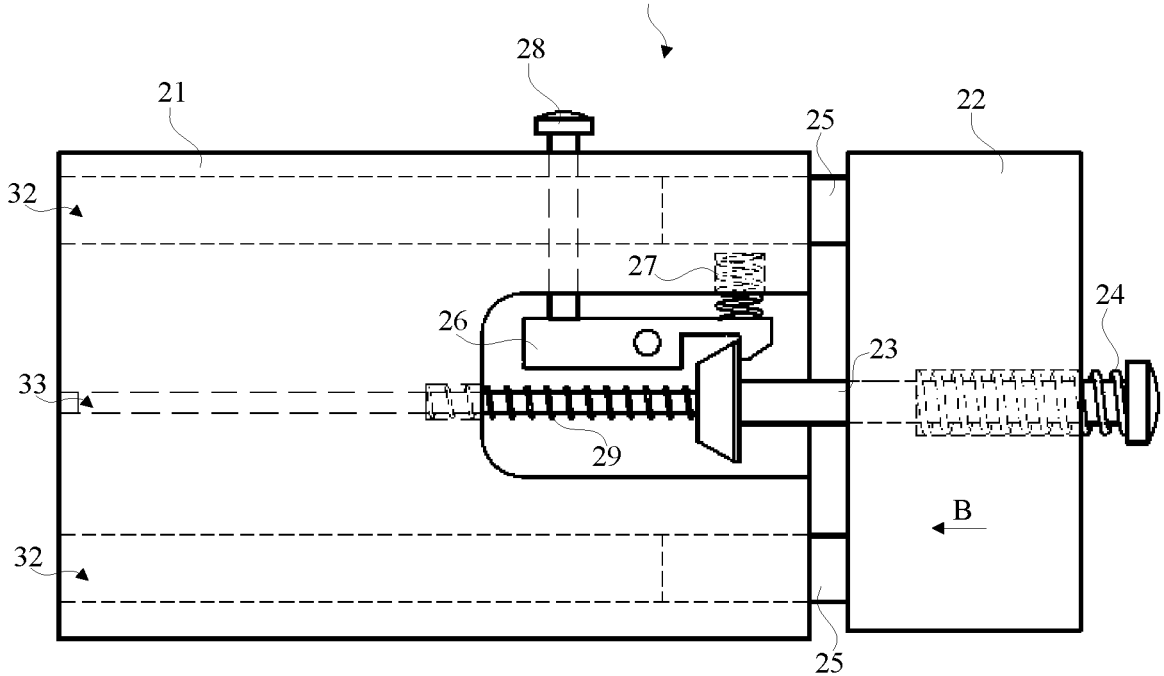
FIG. 4 is Top View II of a graphite furnace locking device in the example of the present utility model, wherein the graphite furnace locking device is in a locked state.

With reference to FIG. 3, graphite furnace locking device 2 provided by the present utility model comprises stationary part 21 and movable part 22 arranged face to face along a first direction (as shown by the direction of X in FIG. 3). A locking unit is provided on stationary part 21, and a latch bolt unit is provided on movable part 22. With reference to FIG. 4, when the graphite furnace head is electrically heated, movable part 22 may move towards stationary part 21 in the first direction to connect the latch bolt unit with the locking unit; at this point, graphite furnace locking device 2 is in a locked state, and the latch bolt unit provides a first elastic force for movable part 22 towards the direction of stationary part 21; graphite furnace locking device 2 tightly clamps the graphite furnace head under the action of the first elastic force to ensure the graphite heating element in the central area has good conductivity with the electrode.

When heating of the graphite furnace head is completed, with reference to FIG. 3, the locking unit is pressed down, and the locking unit disconnects from the latch bolt unit, then graphite furnace locking device 2 is in an unlocked state; the latch bolt unit provides a second elastic force for movable part 22 in a direction away from stationary part 21 (as shown by the direction of A in FIG. 3), and movable part 22 moves away from stationary part 21 in the first direction under the action of the second elastic force to its initial position. It is equivalent to that, when graphite furnace locking device 2 is in an unlocked state, movable part 22 is automatically sprung away, without the need of moving the movable part away by the operator so as to prevent the operator from being injured by scalding and ensure the safety and convenience in operation.

Specifically, with reference to FIG. 3, the latch bolt unit comprises: lock shaft 23 which penetrates through movable part 22 along the first direction and is inserted into stationary part 21; compared with the prior art, lock shaft 23 of the present utility model has been elongated. For example, lock shaft 23 may include an elongated portion 23*c* extending from a first protrusion portion 23*a* towards the stationary part 21. Lock shaft 23 of the present utility model can move in the first direction relative to stationary part 21 and movable part 22 respectively. Lock shaft 23 is provided with the first protrusion portion 23*a* which is used to connect with the lock unit. In addition, the latch bolt unit further comprises first elastic element 24 and second elastic element 29, first elastic element 24 and second elastic element 29 being compression springs, capable of providing action force in the opposite direction to the direction of compression. In the first direction, first protrusion portion 23*a* is located between first elastic element 24 and second elastic element 29. Wherein, one end of first elastic element 24 is connected with one end of lock shaft 23 that goes away and extends out from stationary part 21, and the other end is connected with movable part 22; one end of second elastic element 29 is connected with lock shaft 23 and the other connected with stationary part 21.

With reference to FIG. 3 still, the locking unit comprises: lock pin 26 which is arranged in parallel with lock shaft 23, having first end 26*c* and second end 26*b* along the first direction, first end 26*c* being closer to movable part 22 compared with second end 26*b*; rotation shaft 30 is provided between first end 26*c* and second end 26*b*, and lock pin 26 is in rotational connection with stationary part 21 through rotation shaft 30; the portion of first end 26*c* of lock pin 26 facing lock shaft 23 has recess portion 31 to accommodate first protrusion portion 23*a*. The locking unit further comprises unlock button 28 and third elastic element 27. In this example, third elastic element 27 is a compression spring, capable of providing action force in the opposite direction to the direction of compression. One end of third elastic element 27 is connected with stationary part 21, and the other end is connected with the portion of first end 26*c* of lock pin 26 back facing lock shaft 23. With such a configuration, third elastic element 27 may make the unlocking and locking processes of the locking unit more sensitive.

In some other examples, the other end of third elastic element 27 is connected with the portion of second end 26*b* of lock pin 26 back facing lock shaft 23, and such configuration may also realize the unlocking and locking of the locking unit. In addition, in this example, unlock button 28 is operably inserted in stationary part 21 along the direction perpendicular to the first direction, and one end is located outside of stationary part 21, while the other end is connected with the portion of the second end 26*b* of lock pin 26 back facing lock shaft 23; unlock button 28 is used for pressing lock pin 26 to separate first protrusion portion 23*a* from recess portion 31.

Specially, with reference to FIG. 4, when the graphite furnace head is electrically heated, lock shaft 23 is pressed along the direction towards stationary part 21, first elastic element 24 is compressed, so that movable part 22 can move towards stationary part 21 in the first direction from its initial position; first protrusion part 23*a* on lock shaft 23 contacts lock pin 26, and provides an action force towards stationary part 21; third elastic element 27 is compressed, and lock pin 26 turns around rotation shaft 30 and then first end 26*b* moves away from lock shaft 23, which is equivalent to that lock pin 26 carries out a lever motion, so that first protrusion portion 23*a* is accommodated in recess portion 31 of lock pin 26, and third elastic element 27 returns to its original position, then the connection between the latch bolt unit and the locking unit is realized.

After first protrusion portion 23*a* is accommodated in recess portion 31 of lock pin 26, under the action of third elastic element 27, lock pin 26 functions to limit and fix the position, and at this point, graphite furnace locking device 2 is in a locked state; first elastic element 24 is compressed to provide for the movable part 22 a first elastic force towards the direction of stationary part 21 (as shown by the direction of B in FIG. 4); there is no relative motion between movable part 22 and stationary part 21 in the first direction; graphite furnace locking device 2 tightly clamps the graphite furnace head under the action of the first elastic force to ensure the graphite heating element in the central area has good conductivity with the electrode.

It needs to be further pointed out that, when graphite furnace locking device 2 is in a locked state, although second elastic element 29 is compressed, due to the position limiting effect of lock pin 26, the elastic force of second elastic element 29 generated by compression is offset, and what really functions is first elastic element 24; the first elastic force ensures that there is an elastic force contracting towards the center between movable part 22 and stationary part 21, which ensures there is good conductivity of the graphite heating element in the central area.

When heating of the graphite furnace head is completed, with reference to FIG. 3, unlock button 28 in the locking unit is pressed, and unlock button 28 moves towards lock shaft 26, then lock pin 26 is pressed, and third elastic element 27 is compressed, and lock pin 26 turns around rotation shaft 30, then first end 26*c* moves away from lock shaft 23, which is equivalent to that lock pin 26 carries out a lever motion. Thus, the separation of first protrusion portion 23*a* from recess portion 31 is realized, and graphite furnace locking device 2 is in an unlocked state. At this point, lock pin 26 no longer functions to limit the position, and the compressed first elastic element 24 no longer functions after being released to the maximum.

While the release of the compressed second elastic element 29 will push lock shaft 23 to continue to move away from stationary part 21 in the first direction; when first protrusion portion 23*a* on lock shaft 23 is butted against movable part 22, second elastic element 29 continues to apply action force on lock shaft 23, and continues to provide a second elastic force to movable part 22 in a direction away from stationary part 21 (as shown by the direction of A in FIG. 3); under the action of the second elastic force, movable part 22 moves away from stationary part 21 to its original position in the first direction. It is equivalent to that, when graphite furnace locking device 2 is in an unlocked state, movable part 22 is automatically sprung away to realize the functions of automatically springing away and releasing after unlocking to prevent the operator from being injured by scalding so as to ensure the safety and convenience in operation.

It is equivalent to that, when graphite furnace locking device 2 of the present utility model is in an unlocked state and locked state, elastic force with completely opposite directions is generated on lock shaft 23, which can meet the different requirements with respect to internal forces under different working conditions.

With reference to FIG. 3 still, the portion of first end 26c of lock pin 26 facing lock shaft 23 of the present utility model is provided with slope 26a, used for guiding first protrusion portion 23a to be accommodated in recess portion 31 when first protrusion portion 23a moves to contact lock pin 26. It should be noted that, the specific shape of first protrusion portion 23a on lock shaft 23 of the present utility model is not to be specified herein as long as it can be accommodated in recess portion 31 of lock pin 26 to realize the locking function. In this example, first protrusion portion 23a extends along the circumference of lock shaft 23 and first protrusion portion 23a is of an overall cone shape.

After the cone shaped first protrusion portion 23a contacted slope 26a of lock pin 26, it is more beneficial for first protrusion portion 23a to be accommodated in recess portion 31 of lock pin 26, and more beneficial for the locking of graphite furnace locking device 2. Meanwhile, the surface area of the portion of the cone shaped first protrusion portion 23a facing movable part 22 is greater than the portion of first protrusion portion 23a facing stationary part 21. With such configuration, after first protrusion portion 23a is butted against movable part 22, the contact area between first protrusion portion 23a and movable part 22 is big; the second elastic force provided by second elastic element 29 to movable part 22 is more beneficial for driving movable part 22 to move away from stationary part 21 in the first direction to its initial position.

Furthermore, in this example, first elastic element 24 is sleeved on lock shaft 23, and when first elastic element 24 is compressed and sprung away, lock shaft 23 may provide a motion direction to prevent first elastic element 24 from being stuck when used repeatedly. In some other examples, first elastic element 24 may not be sleeved on lock shaft 23 as long as that when lock shaft 23 moves towards stationary part 21, it is able to provide a first elastic force in a direction towards stationary part 21.

In addition, movable part 22 of the present utility model has first through-hole 22a for lock shaft 23 to penetrate through; first elastic element 24 is at least partially located in first through-hole 22a; the other end of first elastic element 24 is connected with the wall of first through-hole 22a. On one hand, first elastic element 24 is sleeved on lock shaft 23; on the other hand, first elastic element 24 is at least partially accommodated in first through-hole 22a, which can provide a dual motion direction, and is more beneficial for preventing first elastic element 24 from being stuck when it is used repeatedly. In some other examples, first elastic element 24 may directly be connected with the outer wall of movable part 22, and not be located in first through-hole 22a, as long as when lock shaft 23 moves towards stationary part 21, it is able to provide a first elastic force in a direction towards stationary part 21.

In addition, with reference to FIG. 3, the end of lock shaft 23 extending out from stationary part 21 of the present utility model is provided with second protrusion portion 23b; one end of first elastic element 24 is connected with second protrusion portion 23b; second protrusion portion 23b can facilitate the operator to press lock shaft 23 so as to drive movable part 22 to move towards stationary part 21. In this example, second protrusion portion 23b extends along the circumference of lock shaft 23, with an overall hemispheric shape. In some other examples, it can be in some other shapes, as long as it can be pressed by an operator.

Furthermore, in this example, with reference to FIG. 3: second elastic element 29 is sleeved on lock shaft 23, and when second elastic element 29 is compressed and sprung away, lock shaft 23 may provide a motion direction to prevent second elastic element 29 from being stuck when it is used repeatedly. In some other examples, second elastic element 29 may not be sleeved on lock shaft 23 as long as that when lock shaft 23 moves towards stationary part 21, and second elastic element 29 is compressed, it is able to provide a second elastic force in a direction away from stationary part 21. In addition, stationary part 21 has second through-hole 33 to be inserted by lock shaft 23; second elastic element 29 is at least partially located in second through-hole 33; the other end of second elastic element 29 is connected with the wall of second through-hole 33.

On one hand, second elastic element 29 is sleeved on lock shaft 23; on the other hand, second elastic element 29 is at least partially accommodated in second through-hole 33, which can provide a dual motion direction, and is more beneficial for preventing second elastic element 29 from being stuck when it is used repeatedly. In some other examples, second elastic element 29 may directly be connected with stationary part 21, and not be located in first through-hole 22a as long as that when lock shaft 23 moves towards stationary part 21, and second elastic element 29 is compressed, it is able to provide a second elastic force in a direction away from stationary part 21.

With reference to FIG. 3 and FIG. 4 still, the portion of movable part 22 facing stationary part 21 is provided with at least one guide rod 25 extending along the first direction; third through-hole 32 for accommodating guide rod 25 is provided on stationary part 21. The number of guide rod 25 is not to be specified herein; in this example, the number of guide rod 25 is two, which are arranged in parallel to each other. Guide rod 25 also functions to guide the motion, so that movable part 22 always moves towards or away from stationary part 21 in the same direction, without deviating from the motion path.

In summary, the above examples provided by the present utility model are to illustratively explain the principles and effects of the present utility model, and are not intended to limit the present utility model. Any person skilled in the art may modify or change the above examples without departing from the spirit and scope of the present utility model. Therefore, any and all modifications or changes with equivalent effects made by a person skilled in the art without departing from the spirit and technical concepts disclosed in the present utility model, shall still be encompassed by the claims of the present utility model.

The invention claimed is:

1. A graphite furnace locking device, comprising:
   a stationary part which is provided with a locking unit; and
   a movable part which is arranged along a first direction facing the stationary part, the movable part being provided with a latch bolt unit which comprises a lock shaft, the lock shaft penetrating through the movable part and the stationary part along the first direction and is configured to move along the first direction relative to the stationary part and the movable part respectively,
   wherein the movable part is configured to move towards the stationary part along the first direction until the latch bolt unit is connected to the locking unit to thereby place the graphite furnace locking device in a locked state;
   wherein the latch bolt unit is configured to provide a first elastic force for the movable part along the first direction towards the stationary part via a first elastic element sleeved on the lock shaft, wherein the locking unit is configured to disconnect from the latch bolt unit to thereby place the graphite furnace locking device in an unlocked state, wherein the latch bolt unit is configured to provide a second elastic force for the movable part in a direction away from the stationary part via a second elastic element sleeved on the lock shaft, and wherein the movable part is configured to move away from the stationary part along the first direction under the action of the second elastic force to its initial position.

2. The graphite furnace locking device according to claim 1, wherein the latch bolt unit further comprises:
a first protrusion portion, provided on the lock shaft, used to connect with the locking unit; and
a second protrusion portion provided on the lock shaft, a first end of the first elastic element connected with the second protrusion portion, and a second end of the first elastic element is connected with the movable part, wherein the first protrusion portion is positioned between the first elastic element and the second elastic element, and wherein a first end of the second elastic element is connected with the first protrusion portion, and the other end being a second end of the second elastic element is connected with the stationary part.

3. The graphite furnace locking device according to claim 2, wherein the movable part has a first through-hole to be penetrated through by the lock shaft, and wherein the first elastic element is at least partially located in the first through-hole and the second end of the first elastic element is connected with a wall of the first through-hole.

4. The graphite furnace locking device according to claim 2, wherein the stationary part has a second through-hole configured to receive the lock shaft, wherein the second elastic element is at least partially located in the second through-hole, and wherein the second end of the second elastic element is connected with a wall of the second through-hole.

5. The graphite furnace locking device according to claim 2, wherein the locking unit comprises:
a lock pin which is arranged in parallel with the lock shaft, the lock pin having
a first end and a second end along the first direction, the first end being closer to the movable part compared with the second end,
a rotation shaft being provided between the first end and the second end, the rotation shaft being in rotational connection with the stationary part, and
a recess portion to accommodate the first protrusion portion;
a third elastic element having a first end connected with the stationary part and a second end connected with the lock pin; and
an unlock button including a first end located outside of the stationary part, and a second end connected with the lock pin, the unlock button operably inserted in the stationary part along a second direction perpendicular to the first direction, and the unlock button being used for pressing configured to press the lock pin in the second direction to separate the first protrusion portion from the recess portion.

6. The graphite furnace locking device according to claim 5, wherein the lock pin is provided with a slope which is used to guide the first protrusion portion to be accommodated in the recess portion when the first protrusion portion moves to contact the lock pin.

7. The graphite furnace locking device according to claim 1, wherein the movable part is further provided with a guide rod extending along the first direction, and wherein the stationary part is provided with a third through-hole configured to receive the guide rod.

* * * * *